3,086,935
ASSEMBLY OF PARALLEL PLATES
Edward F. Groh, Naperville, and David H. Lennox, Elmhurst, Ill., assignors to the United States of America as represented by the United States Atomic Energy Commission
Filed Jan. 25, 1962, Ser. No. 168,856
7 Claims. (Cl. 204—193.2)

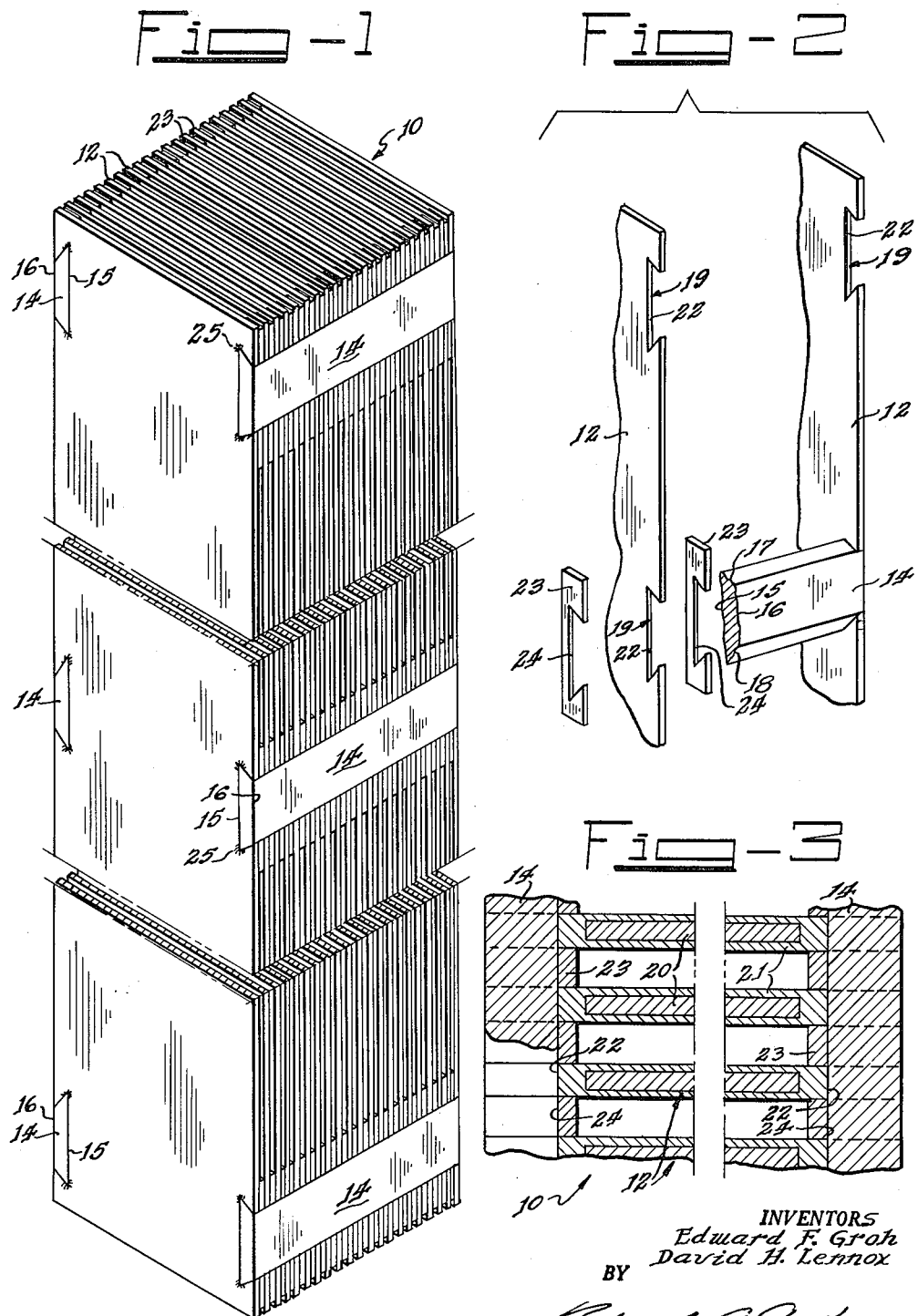

This invention concerns the assembly of parallel spaced plates and more particularly, a rigid construction of spaced plates for use in a nuclear reactor.

Considerable effort has been expended to find a suitable means for fastening parallel plates together in rigid assemblies particularly for use as fuel elements in reactors. For reactor use it is essential that such parallel plates be spaced uniformly from each other to provide uniform flow of coolant between plates. It is also essential to minimize obstructions to coolant flow, and yet to provide sufficient support to prevent bowing or warping of plates relative to each other as a result of coolant velocity or thermal expansion.

Methods of assembling plate-type fuel elements have been a compromise between efforts to limit the amount of extraneous, neutron-absorbing metals and efforts to build adequately strong frames, boxes, etc.

Parallel plates have been assembled into fuel elements in the past by welding each plate to a framework, or box. Another method of assembling fuel plates involves machining locating grooves for each plate in comb-like side supports, adding braze metal and flux, then heating the assembly in a furnace with a reducing atmosphere to obtain brazed bonds.

Such methods of assembling fuel plates require highly skilled labor for welding and brazing operations, special furnace equipment, and prolonged assembly times. In addition, considerable neutron-absorbing metal is introduced into a reactor by the use of frames and boxes and weld metals.

The present invention is concerned with a novel assembly of parallel plates in which a minimum quantity of extraneous metal is introduced into the reactor.

This invention provides means for rigidly securing parallel plates so that the structural strength of each plate is utilized as an additive contribution to the total strength of the assembly of plates. This self-strengthening is accomplished even though the plates are not in contact with each other.

Furthermore, rigidity is accomplished in the present invention with a very small amount of welding, which for many assemblies may be limited to tack welding.

Finally, a precision assembly of parallel plates is accomplished according to the present invention with a minimum of skilled labor and with parts adapted for inexpensive mass production.

Other advantages of this invention will be apparent from the description and the drawing in which:

FIG. 1 is a perspective view of a fuel-element assembly of the present invention;

FIG. 2 is a fragmentary exploded view showing parts of the fuel-element assembly; and FIG. 3 is a fragmentary sectional view of the assembly.

We have found that unexpected rigidity is obtained in a fuel-element assembly 10 as shown in FIG. 1 when individual fuel plates 12 are assembled on keys 14 as shown in FIG. 1 and in FIG. 2.

The cross sectional shape of each key 14 preferably is such that there are two parallel interior and exterior sides 15 and 16 of unequal length joined by two non-parallel sides 17 and 18 of equal length, meeting the side 15 in an acute angle and the side 16 in an obtuse angle, with the result that side 15 is longer than side 16.

Keyways 19 are machined or stamped in the side edges of each fuel plate 12 and have about the same shape and size as the keys 14 have in cross section. The shorter of two parallel sides of each keyway 19 is open and thus is coincident with the associated side edge of the plate 12.

As shown in FIG. 3, each fuel plate 12 is preferably of the "picture frame" type commonly used in many reactors today, which fuel plate comprises a plate-like core 20 of thermal-neutron-fissionable material and a corrosion-resistant jacket 21 of high melting point and low neutron-absorption cross section covering the core at its sides, edges, and ends. The jacket 21 extends beyond the edges of the core 20 sufficiently that the keyways 19 are entirely in the jacket, and the edges of the core are somewhat spaced from bases 22 of the keyways and are not overlapped by adjacent edges of spacers 23.

As shown in FIG. 2, the spacers 23 are thin and flat and have keyways 24 with about the same size and shape as the keyways 19 in the plates 12. The shorter of two parallel sides of each keyway 24 is open and thus is coincident with the associated side edge of the spacer 23. The spacers 23 are a little longer and wider than their keyways. As shown in FIGS. 1 and 3, the spacers 23 are located between the plates 12 at all the keys 14, which fit the keyways 24 in the spacers as they do the keyways 19 in the plates. The keys 14 are about as long as the assembly of plates 12 and spacers 23, and the ends of the keys are bonded to the outermost plates 12 by soldering, brazing, or welding as indicated at 25 in FIG. 1, at the corners of the keys at the ends of the sides 15. The sides 16 of the keys 14 and the side edges of the spacers 23 at which their keyways 24 open lie about in the plane formed by the associated side edges of the plates 12.

The cores 20 of the plates 12 are formed of uranium suitably enriched in $U^{235}$, the balance being $U^{238}$. The jackets 21 of the plates, the keys 14, and the spacers 23 are formed of aluminum, stainless steel, or zirconium alloy. Each plate 12 may be fabricated by a process that involves assembling a core 20, a hollow rectangular frame enclosing the core, and cover plates on opposite sides of the plates and core, and rolling to bond the core, frame, and plates to one another, as disclosed in Saller Patent No. 2,820,751 dated January 21, 1958. The frame and cover plates form the jacket 21. The keyways 19 in the plates 12 may be machined or stamped out. The keys 14 may be machined or extruded to shape. Spacers 23 are formed by machining or stamping.

The present construction with the keys 14, slotted spacers 23, and slotted edges in the fuel plate 12 produces a rigid construction, with a minimum of bonding and a minimum of obstruction to fluid flow between the fuel plates. Since the bonding is performed only between the keys 14 and the outermost plates 12, it is simple, cheap, and easy to perform and holds distortion to a minimum. Obstruction to fluid flow is kept low because of the relatively narrow spacers 23, yet the spacers 23 and keys 14 are kept within, or thereabouts, the side edges of the plates 12, and so the width of space in which the assembly of plates is located is held to a minimum. Consequently, assemblies of plates 12 may be placed on a more closely spaced lattice than would be possible with conventional assemblies surrounded with external boxes, frames, or fittings. The absence of such boxes, frames, or fittings also results in a smaller amount of neutron-absorbing material, and consequently the required amount of fissionable material in a reactor is less. The spacing of keys 14 and associated spacers 23 along the side edges of the plates 12 permits coolant flowing through the spaces between the plates to flow around the side edges thereof, and thus pressure between the plates is equalized.

The advantage in making each key 14 with sides 15 and 16 parallel, and nonparallel sides 17 and 18 equal and doing the same thing for the keyways 19 and 24 in the plates 12 and spacers 23 is that the plates, spacers, and keys may be assembled and fitted together without regard for end-for-end reversal of these parts.

It will be understood that the invention described herein may be modified within the scope of the appended claims.

What is claimed is:

1. A nuclear reactor fuel plate assembly comprising: at least one key having four sides, one side being shorter than an opposite side, the two remaining sides meeting the said opposite side at acute angles and the said one side at obtuse angles; a plurality of plates having registered keyways receiving the key, each keyway having about the same shape and size as the key has in cross section, each keyway being open at one side edge of the plate and so oriented that the said one side of the key is coincident with the said side edge of the plate; a plurality of spacers positioned between successive plates on the key, said spacers each being provided with a keyway having about the same shape and size as the key has in cross section, the keyway in each spacer opening along a side edge thereof which edge is generally coincident with the side edges of the adjacent plates, each spacer being only a little longer and wider than its keyway; and means for securing outermost plates to said key.

2. A rigid nuclear reactor fuel plate assembly comprising: a plurality of keys each having one side shorter than and parallel to an opposite side, and two remaining sides meeting the said opposite side at an acute angle and the said one side at an obtuse angle; a plurality of plates each having keyways at opposite side edges, the plates being assembled with the keyways at one side edge registering with one another and tightly receiving one of the keys and with the keyways at the opposite side edge registering with one another and receiving another of the keys, each keyway having about the same shape and size as the key received has in cross section; and two sets of spacers positioned between successive plates on the keys, each spacer of one set having a keyway receiving the key at one side edge of the plates, each spacer of the other set having a keyway receiving the key at the opposite side edge of the plates, the keyway in each spacer having about the same size and shape as the key received has in cross section, each spacer being only a little longer and wider than the keyway therein, said plates and spacers being in compact relationship on the keys; and means for securing outermost plates to said keys.

3. The assembly specified in claim 2, the keyway in each spacer and plate opening into a side edge thereof, the said one side of each key being generally coincident with the associated side edge of each plate and the associated spacer, the means for securing the outermost plates to the keys being bonds.

4. The assembly specified in claim 3, the said remaining sides of each key being of equal length, the means for securing the outermost plates to the keys being bonds at the ends of the said opposite side of each key.

5. A nuclear reactor fuel plate assembly comprising a plurality of spaced parallel plates, each comprising a plate-like core of nuclear fuel and a corrosion-resistant jacket covering the core, opposite side edges of each plate having keyways formed only in the jacket, each keyway having four sides of which one side is open and coincident with the associated side edge, an opposite side is parallel to and longer than the said one side, and the remaining two sides meet the said one side in obtuse angles, spacers for the plates, one being located between each pair of adjacent plates at each keyway, each spacer having a keyway registering with the associated keyways in the two adjacent plates, said keyway having about the same size and shape as the said associated keyways, each spacer being so narrow as to be out of overlapping relationship with the cores of the adjacent plates and being only a little longer than its keyway, and a plurality of keys located in the keyways of the plates and spacers, each key extending through all of the plates and spacers and having in cross section about the same size and shape as the keyways through which it extends.

6. The assembly specified in claim 5 and further comprising means for securing the outermost plates to the keys.

7. The assembly specified in claim 5, the outermost plates being joined to the keys by welds at the regions where the said two remaining sides of each keyway meet the said opposite side in an acute angle.

References Cited in the file of this patent

UNITED STATES PATENTS

| | | |
|---|---|---|
| 224,486 | Spruce | Feb. 10, 1880 |
| 1,354,998 | Paulson | Oct. 5, 1920 |
| 2,989,456 | Jessen | June 20, 1961 |
| 3,029,198 | Anderson et al. | Apr. 10, 1962 |
| 3,070,527 | Hurford et al. | Dec. 25, 1962 |

OTHER REFERENCES

Murray: Nuclear Reactor Physics, 1957, page 20, Prentice-Hall, Inc., Englewood Cliffs, N.J.